(12) United States Patent
Graul (10) Patent No.: US 10,501,002 B2
(45) Date of Patent: Dec. 10, 2019

(54) CONVERTIBLE VEHICLE CARGO PLATFORM AND CAMPER WITH METHOD

(71) Applicant: John Glenn Graul, Milverton (CA)

(72) Inventor: John Glenn Graul, Milverton (CA)

(*) Notice: Subject to any disclaimer, the term of this patent is extended or adjusted under 35 U.S.C. 154(b) by 99 days.

(21) Appl. No.: 15/949,948

(22) Filed: Apr. 10, 2018

(65) Prior Publication Data

US 2019/0308549 A1   Oct. 10, 2019

(51) Int. Cl.
*B60P 3/34* (2006.01)
*B60P 3/42* (2006.01)
*B60P 1/43* (2006.01)
*B62D 33/02* (2006.01)
*B60P 3/07* (2006.01)

(52) U.S. Cl.
CPC .......... *B60P 3/42* (2013.01); *B60P 1/43* (2013.01); *B60P 3/34* (2013.01); *B62D 33/02* (2013.01); *B60P 3/07* (2013.01)

(58) Field of Classification Search
CPC ...... B60P 1/43; B60P 1/44; B60P 3/06; B60P 3/07; B60P 3/32; B60P 3/34; B60P 3/341; B60P 3/39; B60P 3/42; B62D 33/02; B62D 33/023
USPC .................. 296/10, 158, 163, 164
See application file for complete search history.

(56) References Cited

U.S. PATENT DOCUMENTS

| | | | | |
|---|---|---|---|---|
| 6,371,719 B1* | 4/2002 | Hildebrandt | ............ | B60P 1/435 14/69.5 |
| 6,739,617 B1 | 5/2004 | Martin | | |
| 7,128,364 B2* | 10/2006 | Stabile, Jr. | ............. | B60P 3/341 296/159 |
| 2002/0163221 A1* | 11/2002 | Smith | .................... | B60P 3/341 296/164 |
| 2003/0173758 A1* | 9/2003 | Badger | .................... | B60P 3/07 280/656 |
| 2006/0228202 A1* | 10/2006 | Johnson | ................... | B60P 3/06 414/538 |
| 2017/0113887 A1* | 4/2017 | Pendleton | ................ | B60P 1/43 |

* cited by examiner

*Primary Examiner* — Jason S Daniels
(74) *Attorney, Agent, or Firm* — Charles Runyan (57) ABSTRACT

A vehicle accessory including a platform, first and second sidewalls, first and second eaves, first and second pluralities of receivers, a plurality of canopy-supports, a canopy, and canopy fasteners able to affix the canopy to the plurality of canopy-supports. In an undeployed configuration, the vehicle accessory may function as a support for a payload. The first sidewall and first eave may be pivotably attached to the left edge of the platform, while the second sidewall and second may be pivotably attached to the right side of the platform. In a deployed configuration, the sidewalls and eaves may be pivoted outwards and affixed by attaching the plurality of canopy-supports to the first and second pluralities of receivers, thereby forming a camper configuration.

19 Claims, 5 Drawing Sheets

CONVERTIBLE VEHICLE CARGO PLATFORM AND CAMPER WITH METHOD

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

TECHNICAL FIELD

The present invention relates generally to the field of vehicles of existing art and more specifically relates to a convertible vehicle accessory.

RELATED ART

Often, outdoorsman accessorize their vehicles with devices which provide utility to their vehicle. Often, this vehicle may be a pickup truck. The accessories may include storage containers, trailering devices, support mechanisms, and campers. While many such effective accessories exist, they are limited by the space provided within a pickup truck. Accordingly, it is often difficult or virtually impossible to achieve more than one utility at once by choosing one of these accessories. For example, a user may attach a camper to a pickup truck, or provide space for loading a snowmobile, but usually cannot do both. Not only is accomplishing both tasks simultaneously impossible, but the user must undertake substantial effort to exchange an accessory for accomplishing a different task. Additionally, some accessories are so ungainly that they must be trailered behind the vehicle, adding bulk and often requiring additional registration with local governments. A suitable solution is desired.

U.S. Pat. No. 6,739,617 to Arne L. Martin relates to an expandable trailer. The described expandable trailer includes hinged sidewalls that are capable of moving between a storage configuration and a deployed configuration. In the storage configuration, a reinforced storage surface is available to support heavy cargo, such as a personal watercraft, an off-road vehicle, or a snowmobile. In the deployed configuration, an enclosed living quarters is available for camping and stowing smaller pieces of cargo. A tent assembly may be erected upon the expandable trailer when the hinged sidewalls are in the deployed configuration. The expandable trailer is adapted to be towed behind a car, light truck, jeep, or other automobile.

SUMMARY OF THE INVENTION

In view of the foregoing disadvantages inherent in the known convertible vehicle accessory art, the present disclosure provides a novel convertible vehicle cargo platform and camper with method. The general purpose of the present disclosure, which will be described subsequently in greater detail, is to provide an efficient and effective convertible vehicle cargo platform and camper for use.

A vehicle accessory is disclosed herein. The vehicle accessory includes a platform, first and second sidewalls, first and second eaves, first and second pluralities of receivers, a plurality of canopy-supports, a canopy, and canopy fasteners. The platform may be able to rest on the cargo bed of a vehicle, and may have a left edge alignable with a driver's side of the vehicle, and a right edge alignable with the passenger's side of the vehicle. The first sidewall may be pivotably attached to the left edge of the platform, while the second sidewall may be pivotably attached to the right side of the platform.

Subsequently, the first eave may be pivotably attached to the first sidewall, and the second eave may be pivotably attached to the second sidewall, such that each sidewall and corresponding eave form a double-articulating assembly. The second sidewall and second eave may mirror the first sidewall and first eave. The height and position of the first sidewall, second sidewall, first eave, and second eave are such that they may be pivoted to lie flat upon the platform, disposed end-to-end. When positioned flat against the platform in this way, the sum of all four heights may equal the width of the platform. The first-plurality of receivers may be attached to the first-eave, while the second-plurality of receivers may be attached to the second-eave. The plurality of canopy-supports may each have a first-end and a second-end, the first-end able to removably couple to the first-plurality of receivers during a deployment, and the second-end able to removably couple to the second-plurality of receivers during the deployment. In this way, the plurality of canopy-supports may be bridged from the first-plurality of receivers to the second-plurality of receivers when installed. The plurality of canopy-supports may each have a support-length. The canopy may have a canopy-length equal to or greater than the support-length of the plurality of canopy-supports. The plurality of canopy-fasteners may be able to removably fasten the canopy to the plurality of canopy-supports.

According to another embodiment, a method of converting a vehicle accessory from a cargo platform to a camper is also disclosed herein. The method of converting a vehicle accessory from a cargo platform to a camper includes firstly, providing the described vehicle accessory; secondly, raising the first-sidewall and the first-eave by pivoting the first-sidewall relative to the platform, and the second-sidewall and the second-eave by pivoting the second-sidewall relative to the platform; thirdly, affixing the first-end of each of the plurality of canopy-supports to each of the first-plurality of receivers and the second-end of each of the plurality of canopy-supports to each of the second-plurality of receivers; and fourthly, fastening the canopy to the plurality of canopy-supports using the plurality of canopy-fasteners.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, a convertible vehicle cargo platform and camper with method, constructed and operative according to the teachings of the present disclosure.

The various embodiments of the present invention will hereinafter be described in conjunction with the appended drawings, wherein like designations denote like elements.

DETAILED DESCRIPTION

As discussed above, embodiments of the present disclosure relate to a convertible vehicle accessory and more particularly to a convertible vehicle cargo platform and camper with method as used to improve the conversion of a vehicle platform to a camper.

Generally, the convertible vehicle cargo platform and camper may include an accessory which may be rested or mounted within the cargo bed of a vehicle, particularly a pickup truck. The accessory has a platform which may rest above the cargo bed, especially above the sidewalls of the pickup bed. In some embodiments, the platform may include shelves configured to rest upon the sidewalls in combination with a center portion which is substantially lower than the shelves, such that the center portion may rest on the bottom of the cargo bed of the truck. The platform may include structural variations to accommodate various cargo bed designs, such as fleetsides, stepsides, shortbeds, longbeds, flatbeds, and other designs. Because the platform may conform to the structure of the cargo bed, it may be easily retained while also being easily removable. In some embodiments, the platform may be fastenable to the cargo bed by a variety of engaging means. In an undeployed condition, the accessory has a top level surface formed by four panels, upon which a payload may be rested or secured. The accessory may be particularly suitable and dimensioned for supporting small vehicles, such as ATVs or snowmobiles. Preferably, the accessory can support for example two ATVs or snowmobiles placed side by side on top of the accessory.

The accessory includes features which enable the accessory to be converted from a cargo support to a camper. Attached to the platform are the four panels. The four panels are able to articulate relative to each other. Two of the panels may by connected directly to the platform, preferably by hinges, and may function as sidewalls standing upright on either side of the platform when deployed. The other two panels may by connected directly to the sidewalls opposite to the platform side, preferably by hinges, and may function as eaves when deployed. The eaves may include receivers into which supports may be attached to. The supports may bridge one eave to the other, forming a roof structure, and may be flexible to allow a curved roof profile. The roof may be completed by a canopy which may be fastened to the supports. In this way, in a deployed condition, the platform, sidewalls, eaves, supports, and canopy may provide the structure for a camper suitable to housing a user, particularly for sleeping in. In some embodiments, braces between the sidewalls and the platform may be included to retain the accessory in the deployed state. Alternative mechanisms for retaining the position of the sidewalls, eaves, and other components may be used in other embodiments.

In one embodiment, the vehicle accessory further includes a ramp assembly which is attachable to a trailer hitch of a vehicle. The ramp assembly may include a support piece having a horizontal bar from which ramps may be hung. Preferably, two ramps are used, and each ramp may measure ten feet long when extended. The ramps may each have cavities which can be slid over the horizontal bar to secure the upper end of each ramp. Preferably, the cavities may comprise tubular members built into the ramp. The opposite ends of each ramp may rest upon the ground. The ramp assembly may be structured and dimensioned such that the upper end of each ramp may be placed proximal to the platform, such that when the accessory is in an undeployed condition, a payload such as a small vehicle may be loaded onto the platform using the ramps. In order to achieve this more effectively, the support piece may include an adjustable linkage which allows the upper end of the ramp to be moved when installed relative to the platform. In this way, a user may move each ramp directly next to the platform so that it can be more easily accessed when a payload is being moved from the ramps to the platform. In some embodiments, each ramp may include a hinge located centrally between each end, allowing the ramp to be folded during a non-use condition for storage. Optionally, the ramps may be folded even when installed onto the support piece and may be stowed against the rear of the vehicle in this manner. A retention mechanism may be incorporated in some embodiments to retain the ramps in this stowed position. The retention mechanism may include at least one vertically disposed member to which each ramp may be pinned to. The vertically disposed member may be constructed of angle iron.

Additional structural features, such as front and rear walls, windows, and doors, may be included to provide utility to the accessory when functioning as a camper. These accessories may also be fixed to the platform in a way which enables them to articulate. Alternatively, they may be components which are fastenable to the platform when needed by the user.

Referring now more specifically to the drawings by numerals of reference, there is shown in FIGS. 1-4B, various views of a vehicle accessory 100.

Figure 1:
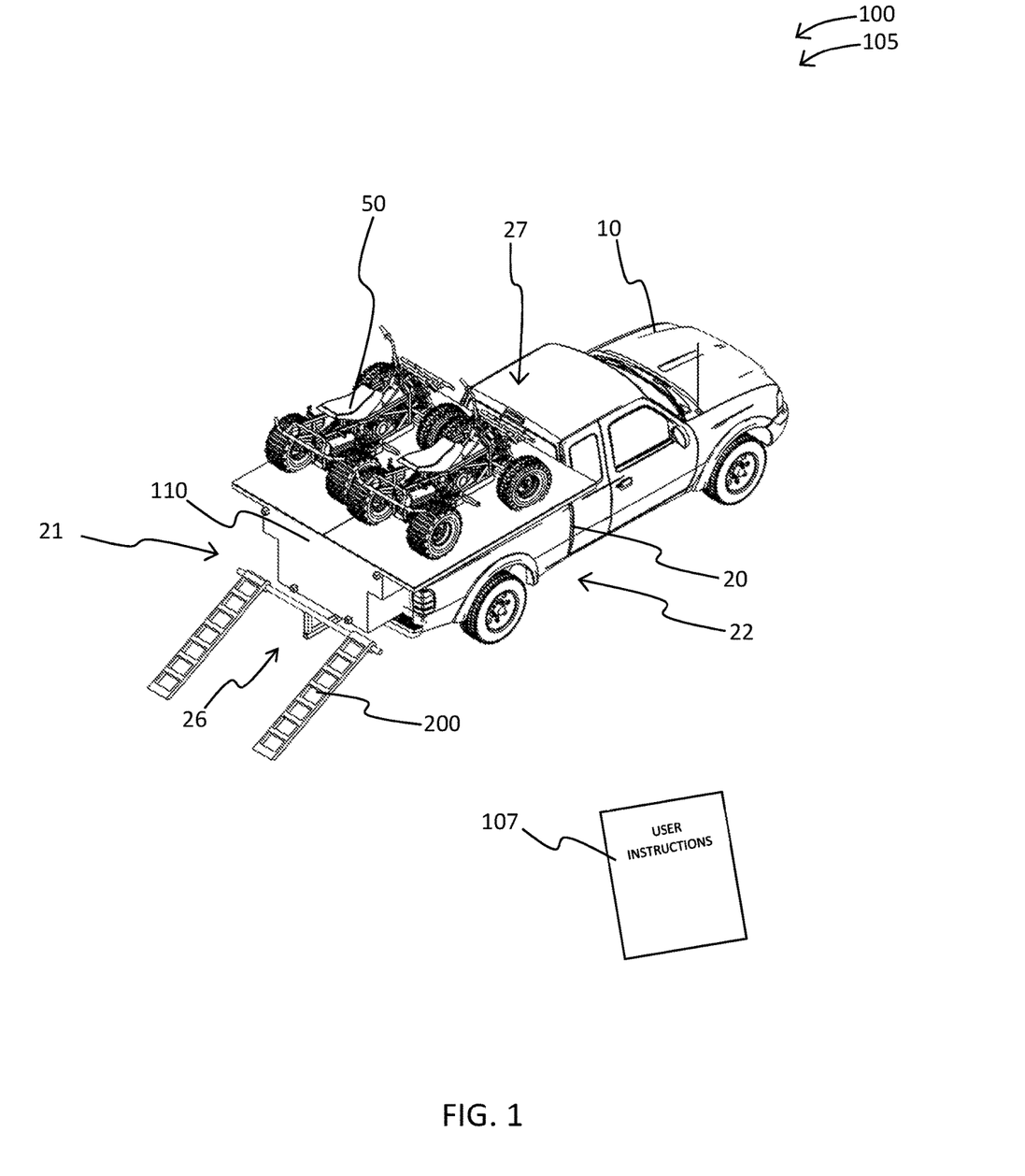
FIG. 1 is a perspective view of the vehicle accessory during an 'in-use' condition, according to an embodiment of the disclosure.

FIG. 1 shows a vehicle accessory 100, according to an embodiment of the present disclosure. Here, the vehicle accessory 100 may be beneficial for use to convert a utility platform to a camper. As illustrated, vehicle accessory 100 may be able to rest upon or fasten to cargo bed 20 of vehicle 10. Cargo bed 20 may be defined by driver's side 21, passenger's side 22, rear-end 26, and front-end 27 as shown. Vehicle accessory 100 may include platform 110 configured to rest upon cargo bed 20. Platform 110 may be able to support at least one payload 50 above cargo bed 20. In some embodiments, vehicle accessory 100 may further include ramp assembly 200, ramp assembly 200 being configured to provide access to platform 110, particularly for facilitating loading of payload 50 onto vehicle accessory 100. Upon reading this specification, it should be appreciated that, under appropriate circumstances, considering such issues as user preferences, design preference, structural requirements, marketing preferences, cost, available materials, technological advances, etc., other structural arrangements such as, for example, alternative fastening and folding means, additional structural features, etc., may be sufficient.

Those with ordinary skill in the art will now appreciate that upon reading this specification and by their understanding the art of vehicles and pickup trucks as described herein, methods of providing a vehicle accessory adaptable to a pickup truck or other vehicle will be understood by those knowledgeable in such art.

According to one embodiment, the vehicle accessory 100 may be arranged as a kit 105. In particular, the vehicle accessory 100 may further include a set of instructions 107. The instructions 107 may detail functional relationships in relation to the structure of the vehicle accessory 100 such that the vehicle accessory 100 can be used, maintained, or the like, in a preferred manner.

Figure 2A:
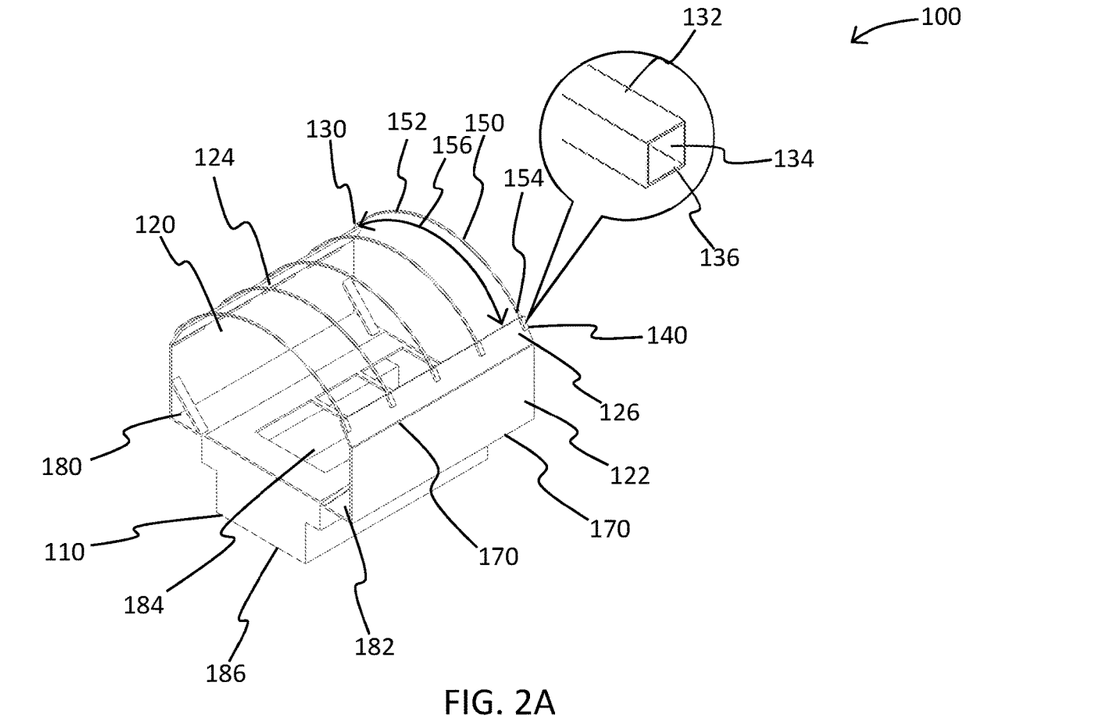
FIG. 2A is a perspective view of the vehicle accessory of FIG. 1 in a deployed condition, according to an embodiment of the present disclosure.

FIG. 2A shows the vehicle accessory 100 of FIG. 1 in a deployed condition, according to an embodiment of the present disclosure. Platform 110 may be structured and arranged to rest on cargo bed 20 (FIG. 1). First-sidewall 120 may be pivotably attached to platform 110. Likewise, second-sidewall 122 may be pivotably attached to platform 110, mirroring first-sidewall 120. Further, first-eave 124 may be pivotably attached to first-sidewall 120. Likewise, second-eave 126 may be pivotably attached to second-sidewall 122, mirroring first-eave 124. First-plurality of receivers 130 may be attached to first-eave 124, while second-plurality of receivers 140 may be attached to second-eave 126, mirroring first-plurality of receivers 130.

The plurality of canopy-supports 150 may each have first-end 152 and second-end 154; first-end 152 able to removably couple to first-plurality of receivers 130 during deployment, and second-end 154 likewise able to removably couple to second-plurality of receivers 140 during deployment, such that plurality of canopy-supports 150 bridge from first-plurality of receivers 130 to second-plurality of receivers 140. Plurality of canopy-supports 150 may each be further defined by support-length 156. Plurality of canopy-supports 150 may be sufficiently flexible to bend up to forty-five degrees during installation of plurality of canopy-supports 150 into first-plurality of receivers 130 and second-plurality of receivers 140 when first-plurality of receivers 130 and second-plurality of receivers 140 are not aligned. As shown, each of first-plurality of receivers 130 and second-plurality of receivers 140 may include tubular member(s) 132 having elongate-cavity 134 and at least one aperture 136 opening into elongate-cavity 134. Elongate-cavity 134 may be substantially parallel to platform 110.

Vehicle accessory 100 may further include plurality of hinges 170. Plurality of hinges 170 may pivotably affix first-sidewall 120 to platform 110, first-eave 124 to first-sidewall 120, second-sidewall 122 to platform 110, and second-eave 126 to second-sidewall 122. Thus, in a preferred embodiment vehicle accessory 100 may include at least four sets of plurality of hinges 170.

Platform 110 may further include first-shelf 180, second-shelf 182, base-cavity 184, and floor 186. First-shelf 180 may correspond to left-edge 111, while second-shelf 182 may correspond to right-edge 112. Base-cavity 184 may be disposed between first-shelf 180 and second-shelf 182, and floor 186 may underlie and define a base to base-cavity 184. First-shelf 180 being structured and arranged to rest on driver's side 21 (FIG. 1) of cargo bed 20 (FIG. 1), while second-shelf 182 may be structured and arranged to rest on passenger's side 22 (FIG. 1) of cargo bed 20 (FIG. 1), and floor 186 may be structured and arranged to rest on a center located between driver's side 21 (FIG. 1) and passenger's side 22 (FIG. 1) of cargo bed 20 (FIG. 1), floor 186 being vertically separated from first-shelf 180 and second-shelf 182. In some embodiments, first-shelf 180 and second-shelf 182 may further include bed materials able to be used for sleeping. First-shelf 180 may be used as a first bed, and second-shelf 182 may be used as a second bed.

Figure 2B:
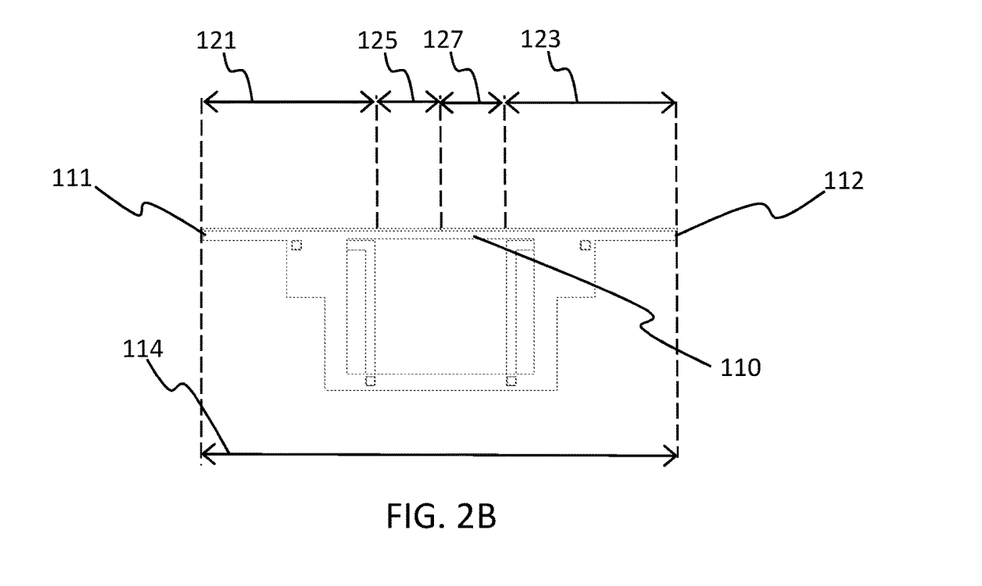
FIG. 2B is a perspective view of the vehicle accessory of FIG. 1 in an undeployed condition, according to an embodiment of the present disclosure.

FIG. 2B is a perspective view of the vehicle accessory 100 of FIG. 1 in an undeployed condition, according to an embodiment of the present disclosure. Platform 110 may have left edge 111 corresponding to driver's side 21 (FIG. 1) of cargo bed 20 (FIG. 1) of vehicle 10 (FIG. 1), right edge 112 corresponding to passenger's side 22 (FIG. 1) of cargo bed 20 (FIG. 1) of vehicle 10 (FIG. 1), and platform-width 114 separating left edge 111 from right edge 112. Vehicle accessory 100 may be further defined by first-sidewall height 121 corresponding to first-sidewall 120 (FIG. 2A), second-sidewall height 123 corresponding to second-sidewall 122 (FIG. 2A), first-eave height 125 corresponding to first-eave 124 (FIG. 2A), and second-eave height 127 corresponding to second-eave 126 (FIG. 2A). Summation of first-sidewall height 121, second-sidewall height 123, first-eave height 125, and second-eave height 127 is substantially equal to platform-width 114, enabling first-sidewall 120 (FIG. 2A), second-sidewall 122 (FIG. 2A), first-eave 124 (FIG. 2A), and second-eave 126 (FIG. 2A) to fold flatly against platform 110 when undeployed. Platform-width 114 may measure one-hundred inches in a preferred embodiment.

Figure 3:
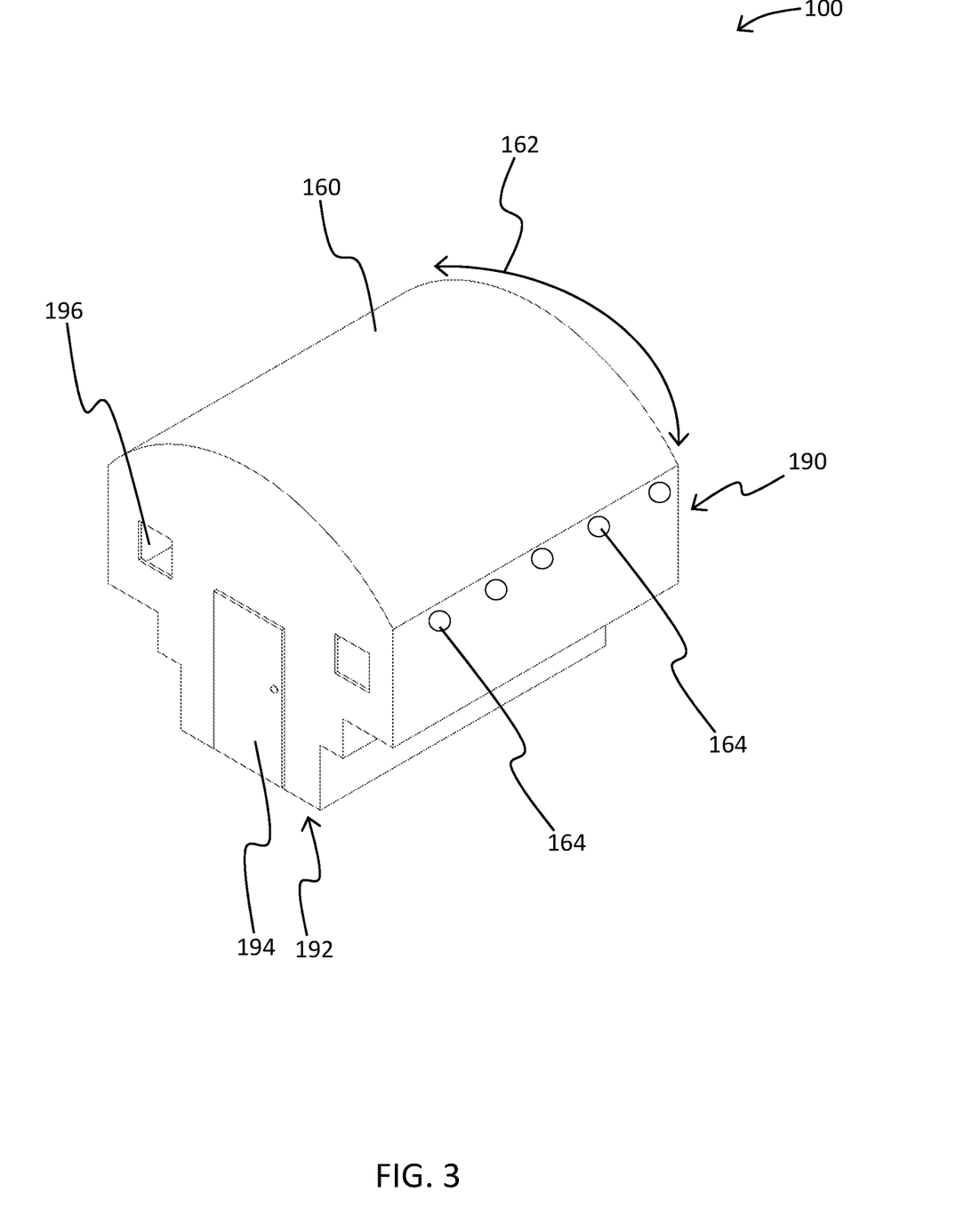
FIG. 3 is a perspective view of the vehicle accessory of FIG. 1, according to an embodiment of the present disclosure.

Referring now to FIG. 3, a perspective view of the vehicle accessory 100 of FIG. 1, according to an embodiment of the present disclosure. Canopy 160 may be releasably fastenable to plurality of canopy-supports 150 (FIG. 2A). Plurality of canopy-fasteners 164 may be able to removably fasten canopy 160 to plurality of canopy-supports 150 (FIG. 2A). Plurality of canopy-fasteners 164 may comprise tie-downs, threaded fasteners, snaps, or another type of fastener. Canopy 160 may have canopy-length 162, canopy-length 162 being equal or greater than support-length 156 (FIG. 2A) of plurality of canopy-supports 150 (FIG. 2A), such that canopy 160 may cover all of plurality of canopy-supports 150 (FIG. 2A) between first-eave 124 (FIG. 2A) and second-eave 126 (FIG. 2A). Preferably, canopy 160 is constructed of canvas.

In one embodiment, vehicle accessory 100 may further comprise rear-wall 190 and front-wall 192 each affixed to platform 110 (FIG. 2A), with rear-wall 190 corresponding to rear-end 26 (FIG. 1) of cargo bed 20 (FIG. 1), and front-wall 192 corresponding to front-end 27 (FIG. 1) of cargo bed 20 (FIG. 1), rear-wall 190 and front-wall 192 each being substantially perpendicular to floor 186 (FIG. 2A). Rear-wall 190 and front-wall 192 may each be parallel to platform-width 114 (FIG. 2B). Vehicle accessory 100 may yet further comprise door 194 integrated into rear-wall 190, and at least one window 196 integrated into rear-wall 190. In some embodiments, rear-wall 190 and front-wall 192 may be releasable and removable from platform 110 (FIG. 2A), and may be optional accessories.

Figure 4A:
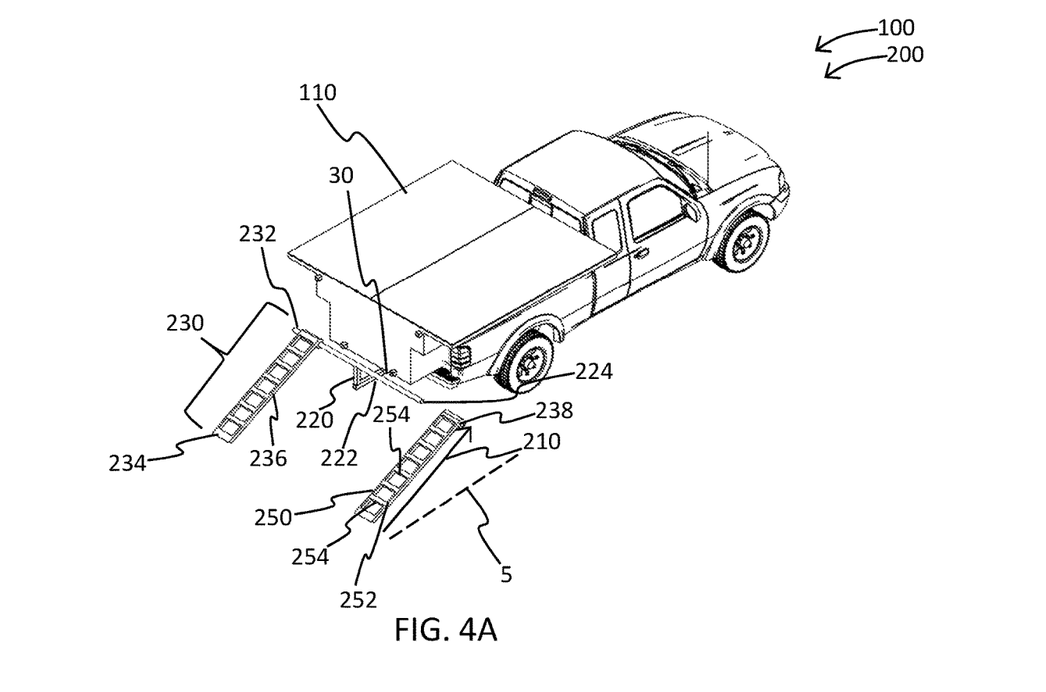
FIG. 4A is a perspective view of the ramp assembly of the vehicle accessory of FIG. 1, according to an embodiment of the present disclosure.

FIG. 4A is a perspective view of the ramp assembly 200 of the vehicle accessory 100 of FIG. 1, according to an embodiment of the present disclosure. Ramp assembly 200 of vehicle accessory 100 may be configured to provide at least one inclined plane 210 functionally connecting platform 110 to ground 5. Ramp assembly 200 may include vehicle-mount 220 and at least one ramp 230. Vehicle-mount 220 may have hitch-interface 222 able to be affixed to trailer-hitch 30, and horizontally-oriented ramp-support 224. At least one ramp 230 may have support-end 232 configured to removably couple to horizontally-oriented ramp-support 224, ground-end 234 able to be rested on ground 5, and ramp-extension 236 connecting support-end 232 to ground-end 234. At least one ramp 230 may be structured and arranged to support payload 50 (FIG. 1) as payload 50 (FIG. 1) is being loaded onto platform 110. Support-end 232 may include support-cavity 238 able to receive horizontally-oriented ramp-support 224, such that at least one ramp 230 may be coupled to vehicle-mount 220 by sliding support-end 232 onto horizontally-oriented ramp-support 224. Ramp-extension 236 of at least one ramp 230 may further include first-rail 250 and second-rail 252 connecting support-end 232 to ground-end 234, and plurality of braces 254 extending between first-rail 250 and second-rail 252. First-rail 250 and second-rail 252 may be parallel to each other and may each be perpendicular to both first-rail 250 and second-rail 252. In a preferred embodiment, at least one ramp 230 may measure eight feet between support-end 232 and ground-end 234.

Figure 4B:
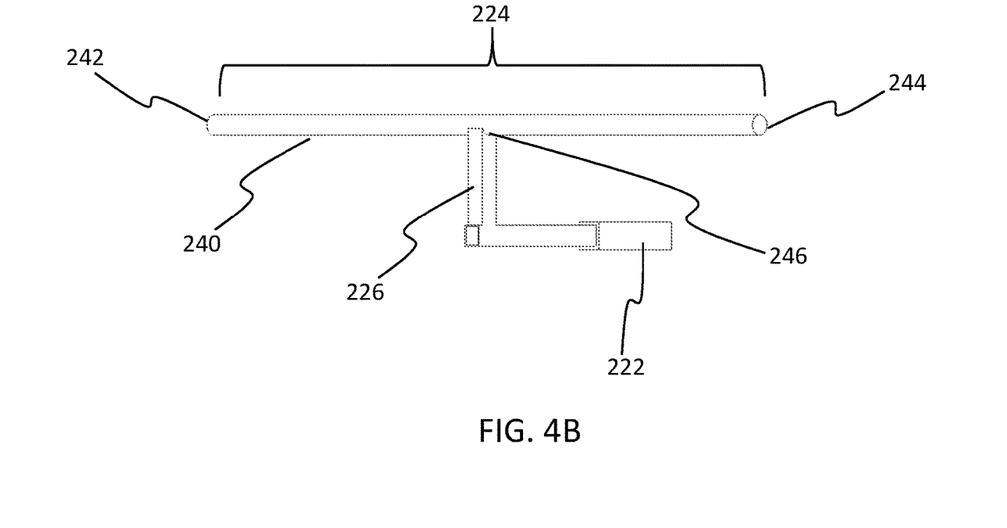
FIG. 4B is a perspective view of the vehicle mount of the ramp assembly of FIG. 4A, according to an embodiment of the present disclosure.

FIG. 4B is a perspective view of the vehicle mount 220 of the ramp assembly 200 of FIG. 1, according to an embodiment of the present disclosure. Vehicle-mount 220 (FIG. 4A) may have hitch-interface 222, horizontally-oriented ramp-support 224, and extension-member 226 coupling horizontally-oriented ramp-support 224 to hitch-interface 222. Horizontally-oriented ramp-support 224 may comprise elongated tubular member 240 having first-tube end 242, second-tube end 244, and extension-juncture 246 centrally located between first-tube end 242 and second-tube end 244. Extension-juncture 246 may interface and couple horizontally-oriented ramp-support 224 to extension-member 226.

Figure 5:
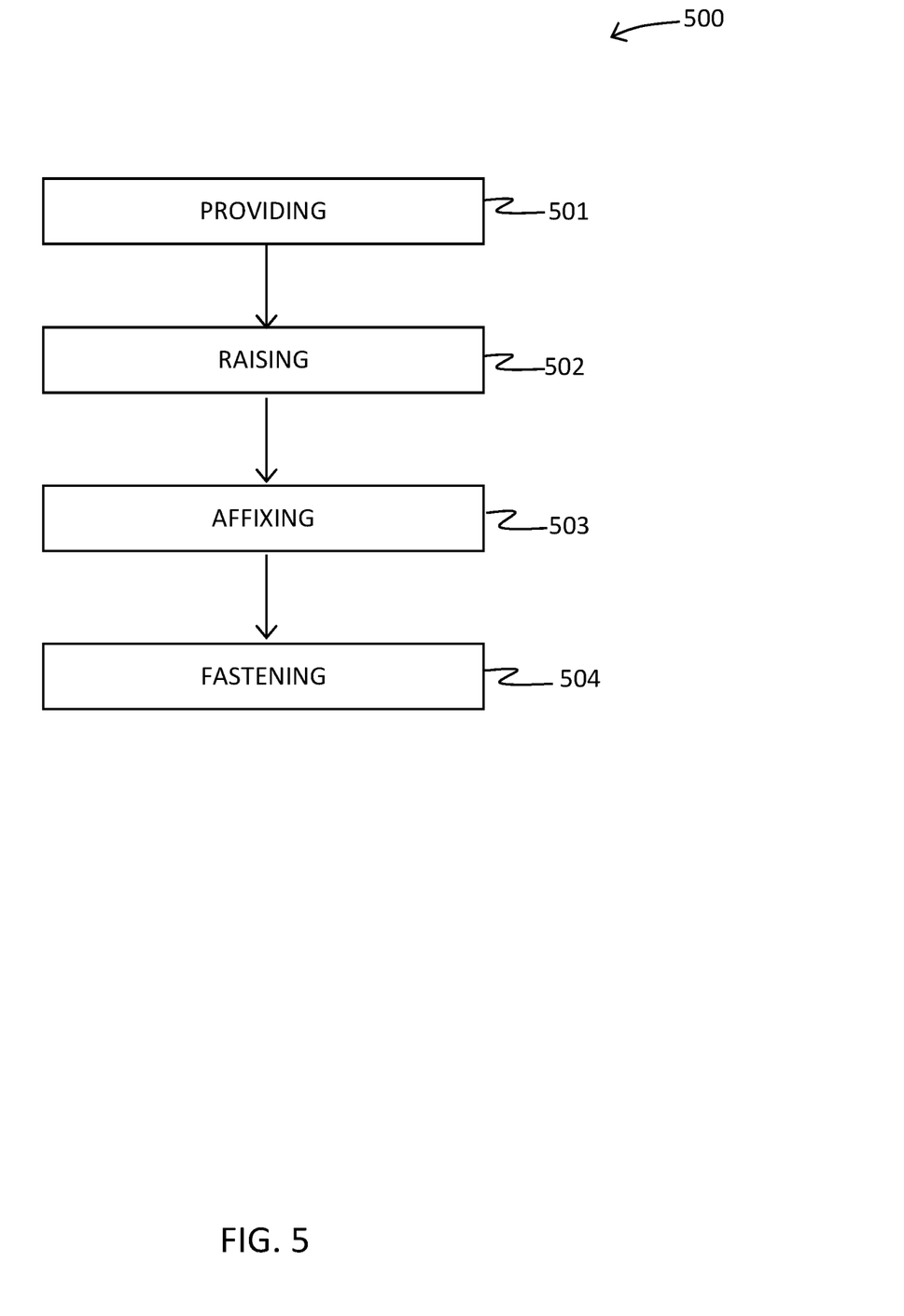
FIG. 5 is a flow diagram illustrating a method of use for converting a vehicle platform to a camper, according to an embodiment of the present disclosure.

Referring now to FIG. 5 showing a flow diagram illustrating a method for converting a vehicle platform to a camper 500, according to an embodiment of the present disclosure. In particular, the method for converting a vehicle platform to a camper 500 may include one or more components or features of the vehicle accessory 100 as described above. As illustrated, the method for converting a vehicle platform to a camper 500 may include the steps of: step one 501, providing a vehicle accessory able to fasten to a cargo bed of a vehicle as described herein; step two 502, raising the first-sidewall and the first-eave by pivoting the first-sidewall relative to the platform, and the second-sidewall and the second-eave by pivoting the second-sidewall relative to the platform; step three 503, affixing the first-end of each of the plurality of canopy-supports to each of the first-plurality of receivers and the second-end of each of the plurality of canopy-supports to each of the second-plurality of receivers; and step four 504, fastening the canopy to the plurality of canopy-supports using the plurality of canopy-fasteners.

It should be noted that the steps described in the method of use can be carried out in many different orders according to user preference. The use of "step of" should not be interpreted as "step for", in the claims herein and is not intended to invoke the provisions of 35 U.S.C. § 112(f). It should also be noted that, under appropriate circumstances, considering such issues as design preference, user preferences, marketing preferences, cost, structural requirements, available materials, technological advances, etc., other methods/means for converting a vehicle platform to a camper, are taught herein.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A vehicle accessory able to fasten to a cargo bed of a vehicle, the vehicle accessory comprising:
    a platform having a left edge corresponding to a driver's side of the cargo bed of the vehicle, a right edge corresponding to a passenger's side of the cargo bed of the vehicle, and a platform-width separating the left edge from the right edge, the platform being structured and arranged to rest on the cargo bed of the vehicle;
    a first-sidewall pivotably attached to the platform, the first-sidewall having a first-sidewall height;
    a second-sidewall pivotably attached to the platform, the second-sidewall having a second-sidewall height, the second-sidewall mirroring the first-sidewall;
    a first-eave pivotably attached to the first-sidewall, the first-eave having a first-eave height;
    a second-eave pivotably attached to the second-sidewall, the second-eave having a second-eave height, the second-eave mirroring the first-eave;
    a first-plurality of receivers attached to the first-eave;
    a second-plurality of receivers attached to the second-eave;
    a plurality of canopy-supports each having a first-end and a second-end, the first-end able to removably couple to the first-plurality of receivers during a deployed-condition, and the second-end able to removably couple to the second-plurality of receivers during the deployed-condition, such that the plurality of canopy-supports bridge from the first-plurality of receivers to the second-plurality of receivers, the plurality of canopy-supports each having a support-length;
    a canopy having a canopy-length, the canopy-length being equal or greater than the support-length of the plurality of canopy-supports; and
    a plurality of canopy-fasteners able to removably fasten the canopy to the plurality of canopy-supports;
    wherein the summation of the first-sidewall height, the second-sidewall height, the first-eave height, and the second-eave height is substantially equal to the platform-width, enabling the first-sidewall, the second-sidewall, the first-eave, and the second-eave to fold flatly against the platform during an undeployed condition.

2. The vehicle accessory of claim 1, wherein the canopy is constructed of canvas.

3. The vehicle accessory of claim 1, wherein the plurality of canopy-supports are sufficiently flexible to bend up to fort-five degrees during installation of the plurality of canopy-supports into the first-plurality of receivers and the second-plurality of receivers when the first-plurality of receivers and the second-plurality of receivers are not aligned.

4. The vehicle accessory of claim 1, wherein each of the first-plurality of receivers and the second-plurality of receivers include a tubular member having an elongate-cavity and at least one aperture opening into the elongate-cavity.

5. The vehicle accessory of claim 1, further comprising a plurality of hinges pivotably affixing the first-sidewall to the platform, the first-eave to the first-sidewall, the second-sidewall to the platform, and the second-eave to the second-sidewall.

6. The vehicle accessory of claim 1, wherein the platform further comprises a first-shelf corresponding to the left-edge, a second-shelf corresponding to the right-edge, a base-cavity between the first-shelf and the second-shelf, and a floor defining a bottom to the base-cavity, the first-shelf being structured and arranged to rest on a driver's side sidewall of the cargo bed of the vehicle, the second-shelf being structured and arranged to rest on a passenger's side sidewall of the cargo bed vehicle, and the floor being structured and arranged to rest on a center of the cargo bed of the vehicle, the floor being vertically separated from the first-shelf and the second-shelf.

7. The vehicle accessory of claim 6, further comprising a first-bed disposed on the first-shelf, and a second-bed disposed on the second-shelf, the first-bed and the second-bed each comprising sleeping beds suitable for accommodating an adult.

8. The vehicle accessory of claim 1, further comprising a rear-wall and a front-wall each affixed to the platform, the rear-wall corresponding to a rear-end of the cargo bed of the vehicle, the front-wall corresponding to a front-end of the cargo bed of the vehicle, the rear-wall and the front-wall each being substantially perpendicular to the floor, the rear-wall and the front-wall each being parallel to the platform-width.

9. The vehicle accessory of claim 8, further comprising a door integrated into the rear-wall.

10. The vehicle accessory of claim 8, further comprising at least one window integrated into the rear-wall.

11. The vehicle accessory of claim 1, wherein the platform-width is one-hundred inches.

12. The vehicle accessory of claim 1, further comprising a ramp assembly configured to provide at least one inclined plane connecting the platform to a ground, the ramp assembly including
a vehicle-mount having a hitch-interface able to be affixed to a trailer-hitch, a horizontally-oriented ramp-support, and an extension-member coupling the ramp-support to the hitch-interface; and
at least one ramp having a support-end configured to removably couple to the ramp-support, and a ground-end able to be rested on the ground, and a ramp-extension connecting the support-end to the ground-end.

13. The vehicle accessory of claim 12, wherein the support-end includes a support-cavity able to receive the ramp-support, such that the at least one ramp may be coupled to the vehicle-mount by sliding the support-end onto the ramp-support.

14. The vehicle accessory of claim 12, wherein the ramp-support comprises an elongated tubular member having a first-tube end, a second-tube end, and an extension-juncture centrally located between the first-tube end and the second-tube end, the extension-juncture interfacing the ramp-support to the extension-member.

15. The vehicle accessory of claim 12, wherein the ramp-extension of the at least one ramp further includes a first-rail and a second-rail connecting the support-end to the ground-end, and a plurality of braces extending between the first-rail and the second-rail, the first-rail and the second-rail being parallel to each other, the plurality of braces each being perpendicular to the first-rail and the second-rail.

16. The vehicle accessory of claim 12, wherein the at least one ramp measures eight feet between the support-end and the ground-end.

17. A convertible vehicle cargo platform and camper able to fasten to a cargo bed of a vehicle, the convertible vehicle cargo platform and camper comprising:
a platform having a left edge corresponding to a driver's side of the cargo bed of the vehicle, a right edge corresponding to a passenger's side of the cargo bed of the vehicle, and a platform-width separating the left edge from the right edge, the platform being structured and arranged to rest on the cargo bed of the vehicle;
a first-sidewall pivotably attached to the platform, the first-sidewall having a first-sidewall height;
a second-sidewall pivotably attached to the platform, the second-sidewall having a second-sidewall height, the second-sidewall mirroring the first-sidewall;
a first-eave pivotably attached to the first-sidewall, the first-eave having a first-eave height;
a second-eave pivotably attached to the second-sidewall, the second-eave having a second-eave height, the second-eave mirroring the first-eave;
a first-plurality of receivers attached to the first-eave;
a second-plurality of receivers attached to the second-eave;
a plurality of canopy-supports each having a first-end and a second-end, the first-end able to removably couple to the first-plurality of receivers during a deployed-condition, and the second-end able to removably couple to the second-plurality of receivers during the deployed-condition, such that the plurality of canopy-supports bridge from the first-plurality of receivers to the second-plurality of receivers, the plurality of canopy-supports each having a support-length;
a canopy having a canopy-length, the canopy-length being equal or greater than the support-length of the plurality of canopy-supports; and
a plurality of canopy-fasteners able to removably fasten the canopy to the plurality of canopy-supports;
wherein the summation of the first-sidewall height, the second-sidewall height, the first-eave height, and the second-eave height is substantially equal to the platform-width, enabling the first-sidewall, the second-sidewall, the first-eave, and the second-eave to fold flatly against the platform during an undeployed condition;
wherein the canopy is constructed of canvas;
wherein the plurality of canopy-supports are sufficiently flexible to bend up to forty-five degrees during installation of the plurality of canopy-supports into the first-plurality of receivers and the second-plurality of receivers when the first-plurality of receivers and the second-plurality of receivers are not aligned;
wherein each of the first-plurality of receivers and the second-plurality of receivers include a tubular member having an elongate-cavity and at least one aperture opening into the elongate-cavity;
further comprising a plurality of hinges pivotably affixing the first-sidewall to the platform, the first-eave to the first-sidewall, the second-sidewall to the platform, and the second-eave to the second-sidewall;
wherein the platform further comprises a first-shelf corresponding to the left-edge, a second-shelf corresponding to the right-edge, a base-cavity between the first-shelf and the second-shelf, and a floor defining a bottom to the base-cavity, the first-shelf being structured and arranged to rest on a driver's side sidewall of the cargo bed of the vehicle, the second-shelf being structured and arranged to rest on a passenger's side sidewall of the cargo bed vehicle, and the floor being structured and arranged to rest on a center of the cargo bed of the vehicle, the floor being vertically separated from the first-shelf and the second-shelf;

further comprising a first-bed disposed on the first-shelf, and a second-bed disposed on the second-shelf, the first-bed and the second-bed each comprising sleeping beds suitable for accommodating an adult;

further comprising a rear-wall and a front-wall each affixed to the platform, the rear-wall corresponding to a rear-end of the cargo bed of the vehicle, the front-wall corresponding to a front-end of the cargo bed of the vehicle, the rear-wall and the front-wall each being substantially perpendicular to the floor, the rear-wall and the front-wall each being parallel to the platform-width;

further comprising a door integrated into the rear-wall;

further comprising at least one window integrated into the rear-wall;

wherein the platform-width is one-hundred inches;

further comprising a ramp assembly configured to provide at least one inclined plane connecting the platform to a ground, the ramp assembly including
  a vehicle-mount having a hitch-interface able to be affixed to a trailer-hitch, a horizontally-oriented ramp-support, and an extension-member coupling the ramp-support to the hitch-interface; and
  at least one ramp having a support-end configured to removably couple to the ramp-support, and a ground-end able to be rested on the ground, and a ramp-extension connecting the support-end to the ground-end;

wherein the support-end includes a support-cavity able to receive the ramp-support, such that the at least one ramp may be coupled to the vehicle-mount by sliding the support-end onto the ramp-support;

wherein the ramp-support comprises an elongated tubular member having a first-tube end, a second-tube end, and an extension-juncture centrally located between the first-tube end and the second-tube end, the extension-juncture interfacing the ramp-support to the extension-member;

wherein the ramp-extension of the at least one ramp further includes a first-rail and a second-rail connecting the support-end to the ground-end, and a plurality of braces extending between the first-rail and the second-rail, the first-rail and the second-rail being parallel to each other, the plurality of braces each being perpendicular to the first-rail and the second-rail; and wherein the at least one ramp measures eight feet between the support-end and the ground-end.

18. The vehicle accessory of claim 17, further comprising set of instructions; and
  wherein the vehicle accessory is arranged as a kit.

19. A method of converting a vehicle platform to a camper, the method comprising the steps of:
  providing a vehicle accessory able to fasten to a cargo bed of a vehicle, the vehicle accessory comprising a platform having a left edge corresponding to a driver's side of the cargo bed of the vehicle, a right edge corresponding to a passenger's side of the cargo bed of the vehicle, and a platform-width separating the left edge from the right edge, the platform being structured and arranged to rest on the cargo bed of the vehicle, a first-sidewall pivotably attached to the platform, the first-sidewall having a first-sidewall height, a second-sidewall pivotably attached to the platform, the second-sidewall having a second-sidewall height, the second-sidewall mirroring the first-sidewall, a first-eave pivotably attached to the first-sidewall, the first-eave having a first-eave height, a second-eave pivotably attached to the second-sidewall, the second-eave having a second-eave height, the second-eave mirroring the first-eave, a first-plurality of receivers attached to the first-eave, a second-plurality of receivers attached to the second-eave, a plurality of canopy-supports each having a first-end and a second-end, the first-end able to removably couple to the first-plurality of receivers during a deployed-condition, and the second-end able to removably couple to the second-plurality of receivers during the deployed-condition, such that the plurality of canopy-supports bridge from the first-plurality of receivers to the second-plurality of receivers, the plurality of canopy-supports each having a support-length, a canopy having a canopy-length, the canopy-length being equal or greater than the support-length of the plurality of canopy-supports, and a plurality of canopy-fasteners able to removably fasten the canopy to the plurality of canopy-supports, wherein the summation of the first-sidewall height, the second-sidewall height, the first-eave height, and the second-eave height is substantially equal to the platform-width, enabling the first-sidewall, the second-sidewall, the first-eave, and the second-eave to fold flatly against the platform during an undeployed condition;

raising the first-sidewall and the first-eave by pivoting the first-sidewall relative to the platform, and the second-sidewall and the second-eave by pivoting the second-sidewall relative to the platform;

affixing the first-end of each of the plurality of canopy-supports to each of the first-plurality of receivers and the second-end of each of the plurality of canopy-supports to each of the second-plurality of receivers; and fastening the canopy to the plurality of canopy-supports using the plurality of canopy-fasteners.

\* \* \* \* \*